(12) United States Patent
Dilluvio

(10) Patent No.: US 7,032,952 B2
(45) Date of Patent: Apr. 25, 2006

(54) DUAL ACTING DECKLID

(75) Inventor: Christopher J Dilluvio, Farmington Hills, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/875,960

(22) Filed: Jun. 24, 2004

(65) Prior Publication Data

US 2005/0285428 A1    Dec. 29, 2005

(51) Int. Cl.
*B60J 7/20* (2006.01)
*B62D 25/20* (2006.01)

(52) U.S. Cl. ............................ 296/107.08; 296/136.07; 296/76

(58) Field of Classification Search ........... 296/107.08, 296/136.07, 76
See application file for complete search history.

(56) References Cited

U.S. PATENT DOCUMENTS

| | | | |
|---|---|---|---|
| 1,990,848 A | 2/1935 | Velo | |
| 2,800,361 A | 7/1957 | Kubacka | |
| 3,211,494 A | 10/1965 | Husko | |
| 5,746,470 A | 5/1998 | Seel et al. | |
| 5,823,606 A | 10/1998 | Schenk et al. | |
| 5,944,378 A | 8/1999 | Mather et al. | |
| 5,967,590 A | 10/1999 | Beierl et al. | |
| 6,010,178 A | 1/2000 | Hahn et al. | |
| 6,030,023 A | 2/2000 | Guillez | |
| 6,062,628 A | 5/2000 | Guillez | |
| 6,092,335 A | 7/2000 | Queveau et al. | |
| 6,142,555 A | 11/2000 | Huber | |
| 6,145,915 A | 11/2000 | Queveau et al. | |
| 6,164,713 A | 12/2000 | Graf et al. | |
| 6,168,224 B1 | 1/2001 | Henn et al. | |
| 6,186,577 B1 | 2/2001 | Guckel et al. | |
| 6,193,300 B1 | 2/2001 | Nakatomi et al. | |
| 6,217,104 B1 | 4/2001 | Neubrand | |
| 6,250,707 B1 | 6/2001 | Dintner et al. | |
| 6,270,144 B1 | 8/2001 | Schenk | |
| 6,283,530 B1 | 9/2001 | Hollerbach | |
| 6,293,605 B1 | 9/2001 | Neubrand | |
| 6,315,349 B1 | 11/2001 | Kinnanen | |
| 6,325,445 B1 | 12/2001 | Schenk | |
| 6,352,298 B1 | 3/2002 | Hayashi et al. | |
| 6,357,815 B1 | 3/2002 | Queveau et al. | |
| 6,361,097 B1 | 3/2002 | Lechkun | |
| 6,419,294 B1 | 7/2002 | Neubrand | |
| 6,511,118 B1 | 1/2003 | Liedmeyer et al. | |
| 6,578,899 B1 | 6/2003 | Hasselgruber et al. | |
| 6,585,307 B1 | 7/2003 | Queveau et al. | |
| 6,595,572 B1 | 7/2003 | Schuler et al. | |
| 6,604,775 B1 | 8/2003 | Obendiek | |

(Continued)

*Primary Examiner*—Dennis H. Pedder
(74) *Attorney, Agent, or Firm*—Harness, Dickey & Pierce P.L.C.

(57) ABSTRACT

In accordance with the present invention, a two-way opening decklid assembly includes a frame and a decklid where the rear portion of the frame is unlatched from a vehicle when the frame is in its open position and is latched to the vehicle when the frame is in its closed position. In another aspect of the present invention, the decklid assembly includes a frame that is coupled to the vehicle with a linkage assembly that causes an entirety of the frame to undergo a lifting and tilting motion when moving between its closed and open position.

41 Claims, 11 Drawing Sheets

U.S. PATENT DOCUMENTS

| | | | |
|---|---|---|---|
| 6,702,362 B1 * | 3/2004 | Eichholz et al. | 296/108 |
| 6,715,819 B1 * | 4/2004 | Weissmueller | 296/107.08 |
| 6,799,788 B1 * | 10/2004 | Plesternings | 296/107.08 |
| 6,824,194 B1 * | 11/2004 | Weissmueller et al. | 296/136.05 |
| 2001/0005089 A1 | 6/2001 | Neubrand | |
| 2003/0020300 A1 | 1/2003 | Zipperle | |
| 2003/0052508 A1 | 3/2003 | Obendiek | |
| 2003/0080581 A1 | 5/2003 | Quindt | |

* cited by examiner

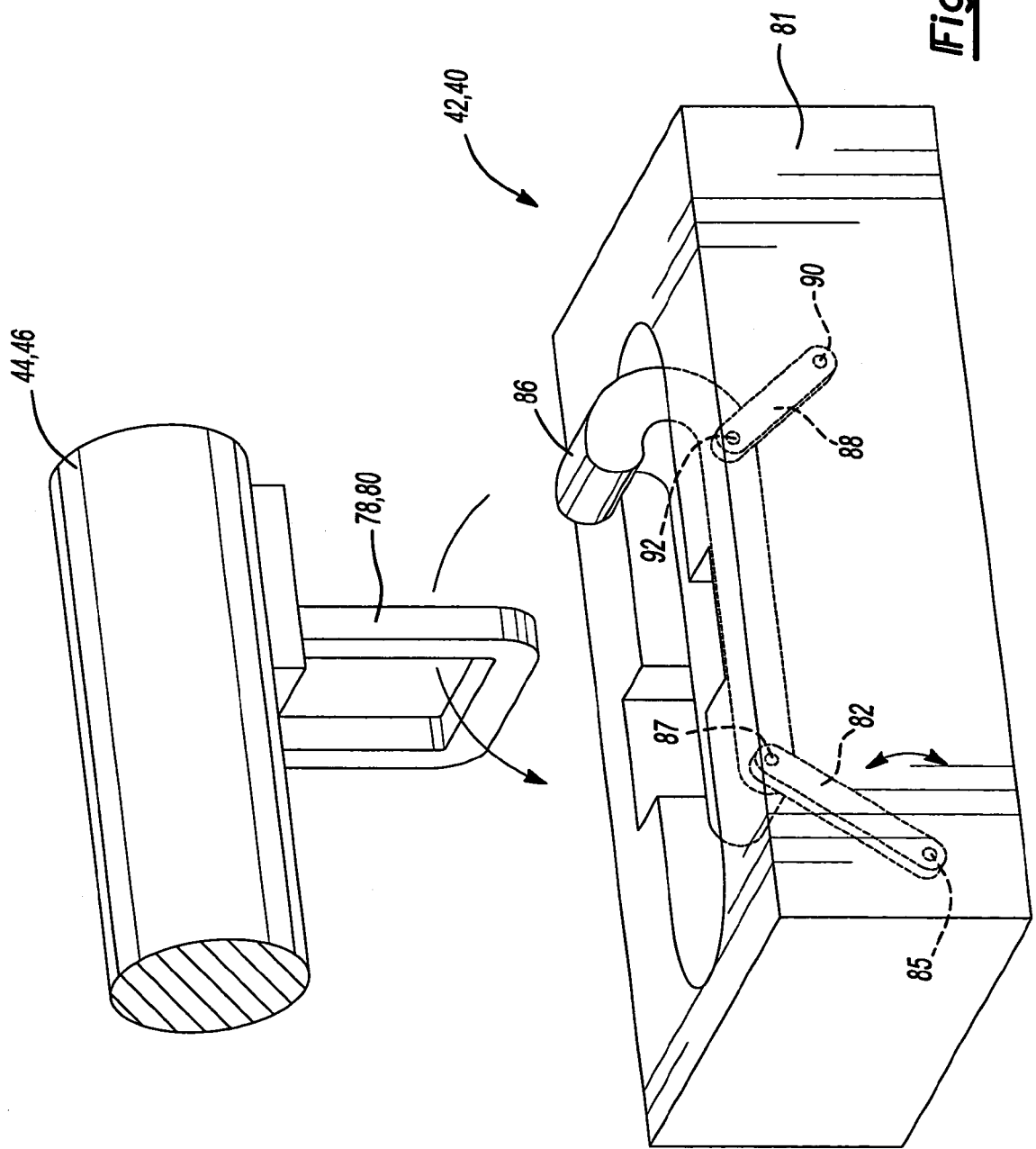

DUAL ACTING DECKLID

BACKGROUND AND SUMMARY OF THE INVENTION

The present invention is generally related to decklids for a convertible roof vehicle, and more particularly to a two-way opening or dual acting decklid for a convertible roof vehicle.

Automotive vehicles having a convertible roof typically stow the convertible roof (when retracted) in a stowage compartment that is behind or aft of the passenger seating area. To provide a desired appearance, the retracted convertible roof can be covered by a tonneau panel. The tonneau panel can be designed to cover the entirety of the stowed convertible roof or a portion thereof. The tonneau panel can also be used to cover the stowage compartment when the convertible roof is in the raised or extended position. To accommodate a movement of the convertible roof from the stowed to the raised position and vice-a-versa, the tonneau panel is operated between open and closed positions to allow access to the stowage compartment.

In some convertible roof vehicles, the convertible roof does not occupy an entire storage area aft of the passenger seating area. For example, the area aft of the passenger seating area can include a stowage compartment for the convertible roof along with a general storage area or trunk behind or aft of the stowage area. The general storage area is covered by a trunk lid, known as a decklid, that moves between open and closed positions to allow access to the general storage area. Accordingly, combination decklids have been devised that open in opposite directions to allow access to the general storage area from a rear of a vehicle and access to the stowage compartment from a forward position on the vehicle. Thus, two-way opening or dual acting decklids are known. The rear portion of a frame of the decklid assembly typically remains fixed to the vehicle in the conventional mechanisms used to provide the two-way opening functionality. The fixing of the rear portion of the frame to the vehicle, however, limits the movement of the decklid assembly. Additionally, because of the limited range of movement, the shape or configuration of the decklid panel may be limited due to potential obstructions with other components of the vehicle body.

In accordance with the present invention, a two-way opening cover assembly includes a frame and a panel where the rear portion of the frame is unlatched from a vehicle when the frame is in its open position and is latched to the vehicle when the frame is in its closed position. In another aspect of the present invention, a decklid assembly includes a frame that is coupled to the vehicle with a linkage assembly that causes an entirety of the frame to undergo a lifting and tilting motion when moving between its closed and open position.

The present invention is advantageous over traditional two-way opening decklid assemblies in that the rear portion of the frame can be selectively latched and unlatched from a vehicle to allow movement between the open and closed positions. The unlatching of the rear portion of the frame allows for additional ranges or paths of motion for the decklid assembly to undergo. Furthermore, the present invention is advantageous because the frame and the decklid coupled to the frame undergo a lifting and tilting motion when the frame is moved from between its closed and open positions. The lifting and tilting motion enables the decklid assembly to use a decklid panel of a desired configuration while avoiding potential obstructions with other components of the body of the vehicle, such as a rear bumper fascia. The decklid assembly of the present invention can be utilized in an automotive vehicle having a hardtop convertible roof or a soft-top convertible roof. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein:

FIG. 5 is an enlarged exploded view of a latching mechanism used in the decklid assembly according to the principle of the present invention;

DETAILED DESCRIPTION OF THE PREFERRED EMBODIMENT

Figure 1:
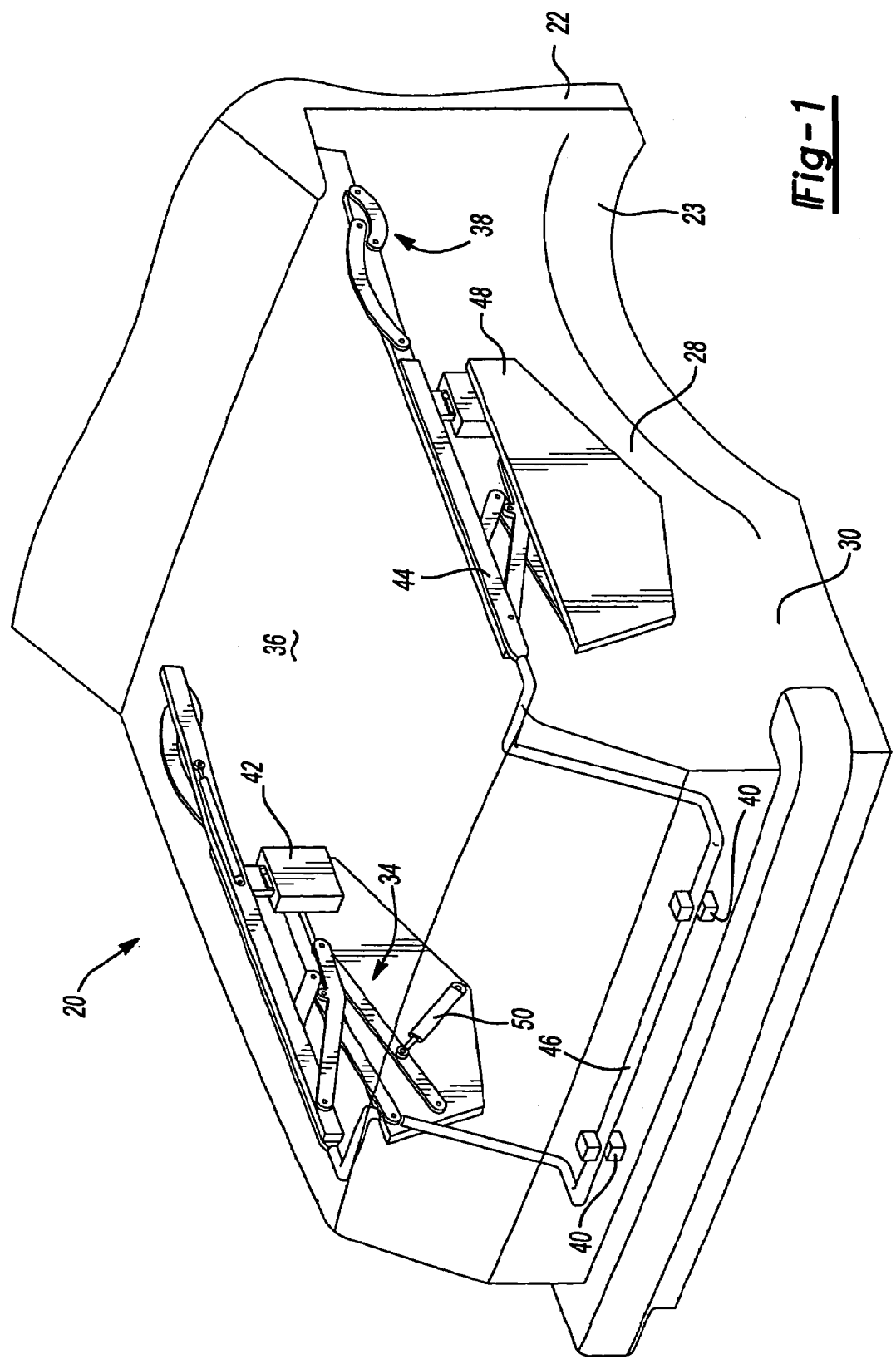
FIG. 1 is a fragmented perspective view of a convertible roof vehicle with a decklid assembly according to the principles of the present invention.

The following description of the preferred embodiment is merely exemplary in nature and is in no way intended to limit the invention, its application, or uses.

Referring to FIGS. 1–4, the preferred embodiment of a dual acting or two-way opening decklid assembly 20 according to the principles of the present invention is shown on an automotive vehicle 22. Vehicle 22 has a body 23, a passenger compartment 24 (shown in FIGS. 6A and 7A), a convertible roof system 26, a stowage compartment 28 for the convertible roof system, and a storage area or trunk 30. Stowage compartment 28 and storage area 30 can be a combined area that is not differentiated by a physical barrier or can be two separate areas separated by a physical barrier. The stowage compartment 28 and storage area 30 are both located behind or aft of passenger compartment 24. Stowage compartment 28 retains convertible roof system 26 when the convertible roof is in the retracted or stowed position, as described below.

Decklid assembly 20 includes a frame 32, rear linkage assemblies 34, a decklid panel or trunk cover 36, front linkage assemblies 38, rear latching mechanisms 40, and front latching mechanisms 42. Frame 32 includes two longitudinal members 44 and two transverse members 46 that space longitudinal members 44 apart and are attached to respective front and rear portions of longitudinal members 44.

A front portion of decklid panel 36 is pivotally coupled to a front portion of frame 32 by front linkage assemblies 38. Front linkage assemblies 38 allow decklid panel 36 to move between open and closed positions to allow access to storage area 30 independent of movement of frame 32, as described below. Rear linkage assemblies 34 are attached to a rear portion of frame 32 and are attached to brackets 48 in storage area 30 of vehicle 22. Rear linkage assemblies 34 are operable to cause frame 32 to move between open and closed positions to allow retraction and extension of convertible roof system 26, as described below.

A pair of powered actuators 50 are connected to brackets 48 and to rear linkage assemblies 34. Powered actuators 50 are operable to move rear linkage assemblies 34 and cause frame 32 to move between the open and closed positions. Powered actuators 50 can take a variety of forms. Preferably, powered actuators 50 are hydraulic cylinders that move between extended and retracted positions to operate rear linkage assemblies 34. Alternatively, powered actuators 50 could be in the form of electric motors that drive rear linkage assemblies 34.

Decklid assembly 20 and its various components are shown symmetrical about a longitudinal, fore-and-aft centerline (not shown) of vehicle 22. For brevity, only one side of decklid assembly 20 is shown and discussed in detail, however, it should be understood that opposite side components are also provided as part of decklid assembly 20 and are mirror images of the side discussed. Also, when using the terms "fore" and "aft," "front" and "back," and "rearward" and "forward" in describing components of decklid assembly 20, such reference refers to the orientation of the components relative to vehicle 22 and when decklid assembly 20 is in its closed position.

Figure 2:
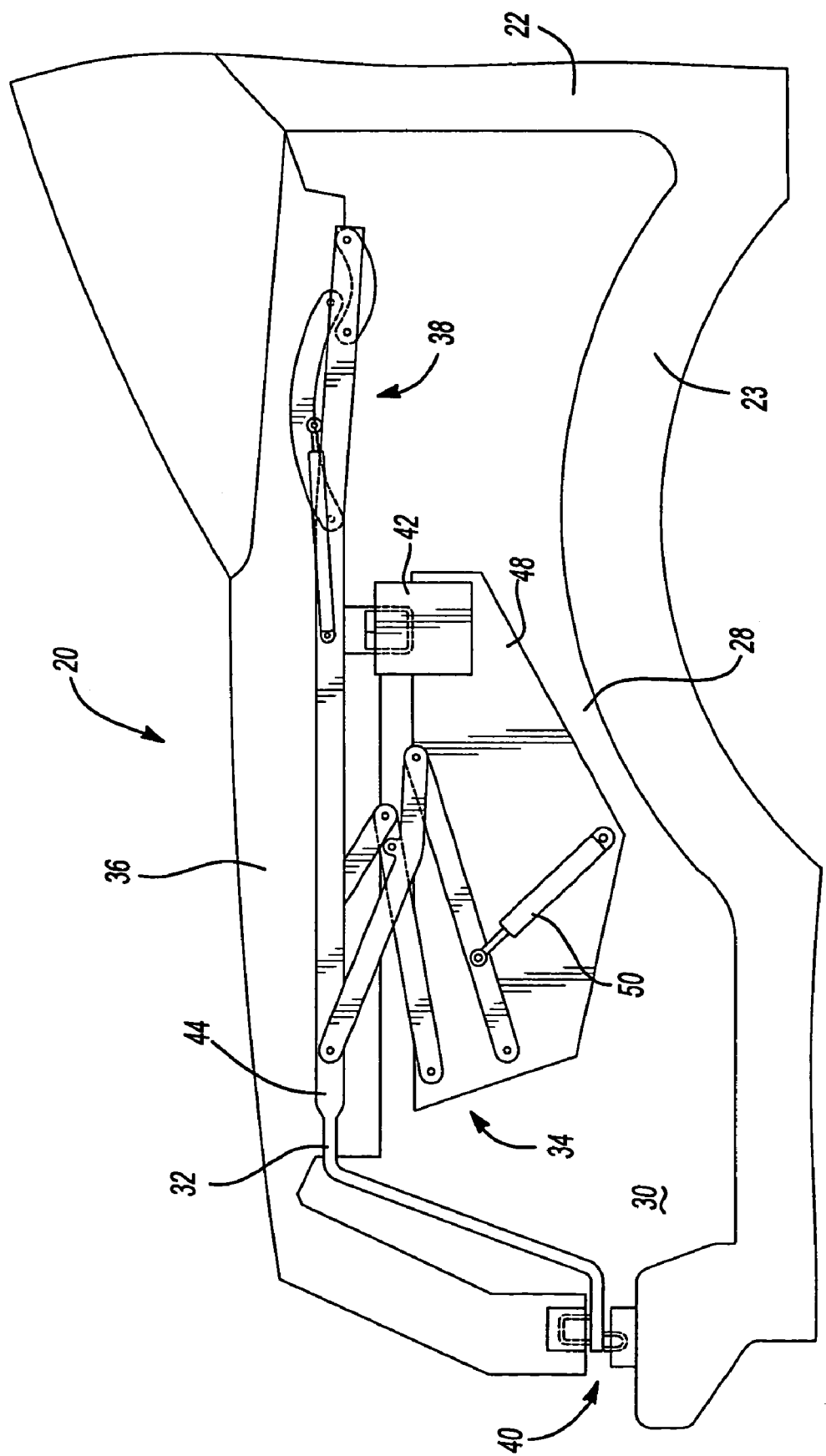
FIG. 2 is a fragmented elevation view of the vehicle of FIG. 1 showing the decklid assembly in a closed position.
Figure 3:
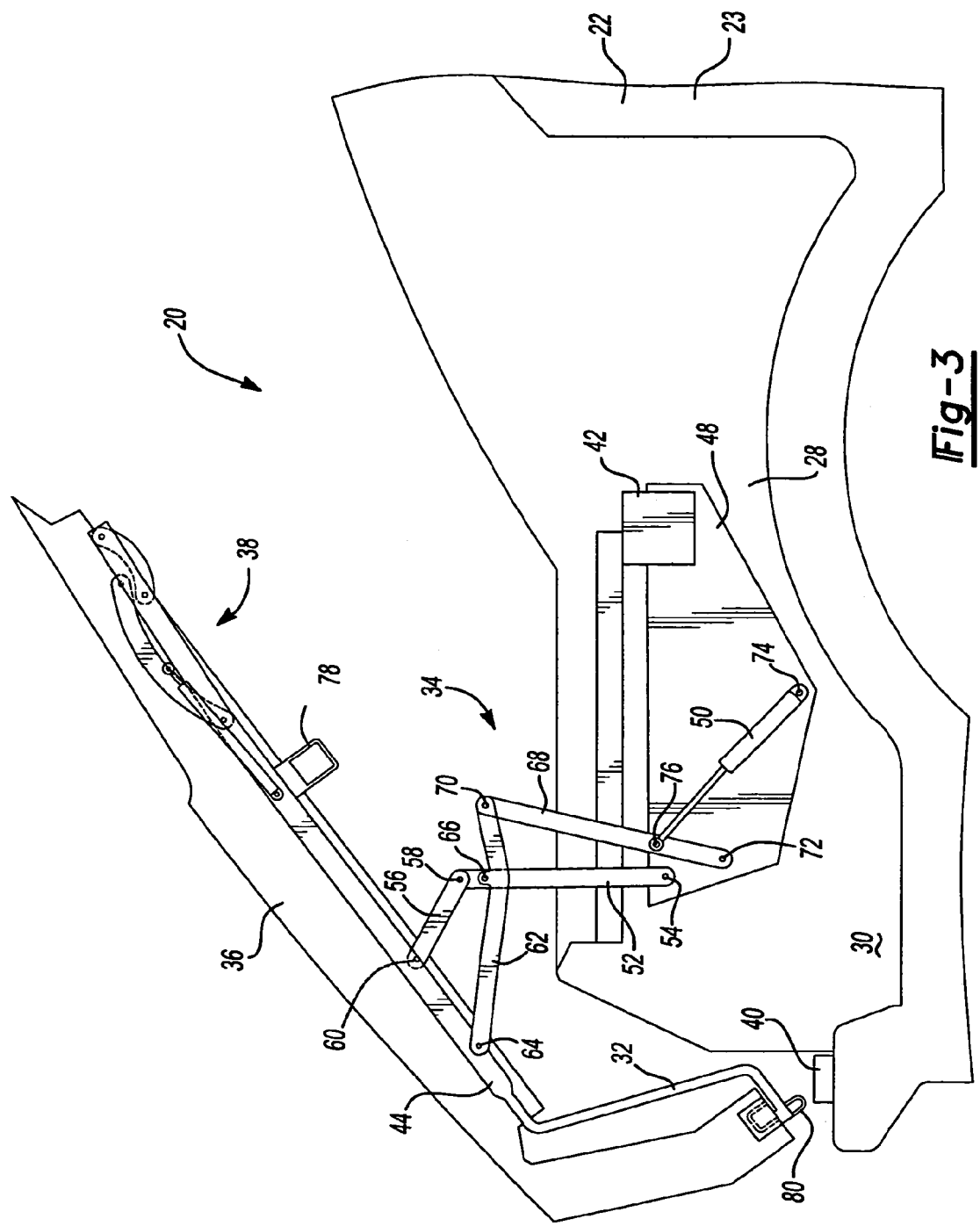
FIG. 3 is a fragmented elevation view of the vehicle of FIG. 2 with the decklid assembly open to allow retraction and extension of the convertible roof.

FIG. 3 illustrates rear linkage assembly 34 which includes a first link 52 having one end pivotally attached to bracket 48 at pivot 54 and an opposite end pivotally attached to an end of a second link 56 at pivot 58. The opposite end of second link 56 is pivotally attached to longitudinal member 44 of frame 32 at pivot 60. One end of a third link 62 is pivotally attached to longitudinal member 44 of frame 32 at pivot 64 which is rearward of pivot 60. An intermediate portion of third link 62 is pivotally coupled to first link 52 at pivot 66. Pivot 66 is located on first link 52 between pivots 54 and 58. An opposite end of third link 62 is pivotally connected to one end of a fourth link 68 at pivot 70. An opposite end of fourth link 68 is pivotally coupled to bracket 48 at pivot 72. Rear linkage assembly 34 thereby forms a 6-bar scissor link linkage assembly that controls and coordinates the movement of frame 32 between its closed, as shown in FIG. 2, and open, as shown in FIG. 3, positions. The 6-bar scissor link linkage assembly includes first link 52, second link 56, longitudinal member 44, third link 62, fourth link 68, and bracket 48, and is defined by pivots 58, 60, 64, 66, 70, 72, and 54.

One end of powered actuator 50 is pivotally coupled to bracket 48 at pivot 74 while an opposite end of actuator 50 is pivotally coupled to fourth link 68 at pivot 76. Powered actuator 50 is also connected to a power supply (not shown) operable to supply the appropriate power to actuator 50 to cause actuator 50 to move rear linkage assembly 34. As can be seen in FIG. 2, when powered actuator 50 is in its retracted position, frame 32 is in the closed position and decklid panel 36 covers stowage compartment 28 along with storage area 30. As powered actuator 50 moves between its retracted position to its extended position, as shown in FIG. 3, fourth link 68 is pushed by powered actuator 50 and causes an entirety of frame 32 to lift upwardly and tilt rearwardly and move to its open position. When frame 32 is in its open position, decklid panel 36 is no longer covering stowage compartment 28 and convertible roof system 26 can be operated to move between its extended end retracted positions. It is preferred that decklid panel 36 remain in its closed position when frame 32 is moved between its open and closed positions. To move frame 32 back to its closed position, powered actuator 50 pulls on fourth link 68 which causes an entirety of frame 32 to tilt forwardly and move downwardly relative to vehicle 22 to its closed position. Thus, powered actuator 50 pushes or pulls fourth link 68 away from or toward powered actuator 50, which causes frame 32 to move between its open and closed positions and allows access to stowage compartment 28 so that convertible roof system 26 can move between extended and retracted position.

Longitudinal member 44 includes a front latching member 78 that is operable to selectively engage with front latching mechanism 42 to retain frame 32 in the closed position. Similarly, rear transverse member 46 includes a rear latching member 80 operable to selectively engage with rear latching mechanism 40 to retain frame 32 in the closed position. Front and rear latching mechanisms 42, 40 selectively secure and release front and rear latching member 78, 80 to respectively maintain frame 32 in its closed position and to allow frame 32 to move to its open position in a lifting and tilting motion.

Referring now to FIG. 5, details of a latching mechanism that can be employed as both a front latching mechanism 42 and a rear latching mechanism 40 are shown. The latching mechanism is a power pull-down type latching mechanism. The latching mechanism utilizes a housing 81 fixedly attached to vehicle 22 in stowage compartment 28 or storage area 30. A first link 82 has one end pivotally connected to housing 81 at pivot 85 and an opposite end pivotally connected to a hook link 86 at pivot 87. One end of a second link 88 is pivotally connected to housing 81 at pivot 90 while an opposite end of second link 88 is pivotally connected to hook link 86 at pivot 92. Thus, the latching mechanism employs a four-bar linkage assembly that includes first link 82, hook link 86, second link 88 and housing 81 and is defined by pivots 87, 92, 90 and 85. An actuator (not shown) is operable to drive first link 82 about pivot 85 to selectively secure and release frame 32 from the latching mechanism. In operation, as a latching member 78, 80 approaches the respective latching mechanism 42, 40, first link 82 is caused to rotate so that hook link 86 raises up and passes through the opening within latching member 78, 80. As first link 82 continues to rotate, hook link 86 pulls latching member 78, 80 into housing 81 thereby securing frame 32 to vehicle 22. To release frame 32, first link 82 is driven in an opposite direction thereby causing hook link 86 to move upwardly out of housing 81 and release latching member 78, 80. It should be appreciated that while a four-bar linkage mechanism is shown as being used for the latching mechanism, other arrangements for selectively securing and releasing frame 32 to/from vehicle 22 can be employed.

Figure 4:
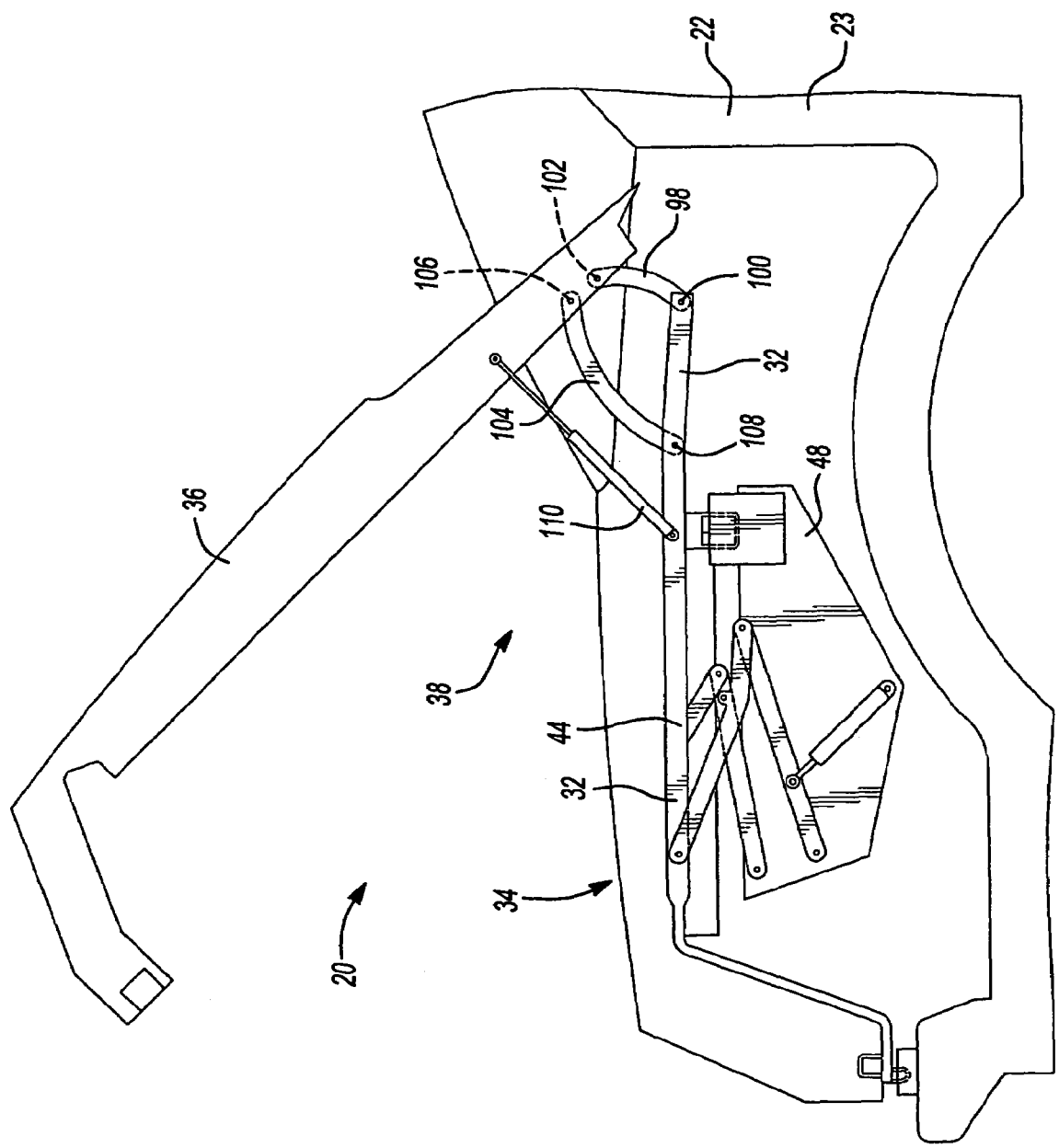
FIG. 4 is a fragmented elevation view of the vehicle of FIG. 1 with the decklid assembly in an open position allowing access to a rear storage area of the vehicle.

Referring now to FIGS. 2 and 4, it can be seen that front linkage assembly 38 is operable to allow decklid panel 36 to move between its closed position, as shown in FIG. 2, and its open position, as shown in FIG. 4, which allows access to storage area 30 from a rear of vehicle 22. Front linkage assembly 38 includes a first link 98, one end of which is pivotally attached to a front portion of longitudinal member 44 of frame 32 at pivot 100. An opposite end of first link 98 is pivotally coupled to a front portion of decklid panel 36 at pivot 102. One end of a second link 104 is pivotally coupled to decklid panel 36 at pivot 106 which is rearward of pivot 102. An opposite end of second link 104 is pivotally coupled to longitudinal member 44 of frame 32 at pivot 108 which is rearward of pivot 100. Thus, front linkage assembly 38 forms a 4-bar linkage assembly which is operable to allow decklid panel 36 to move between its open and closed positions independently of frame 32. The 4-bar linkage assembly includes first link 98, decklid panel 36, second link 104, and longitudinal member 44 of frame 32 and is defined by pivots 102, 106, 108 and 100. A biasing member 110, in this case in the form of a gas strut, is pivotally attached to longitudinal member 44 of frame 32 and decklid panel 36. Gas strut 110 helps retain decklid panel 36 in the open position. Alternatively, other biasing mechanisms can be used, such as springs, without departing from the scope of the present invention. Decklid panel 36 is capable of moving between its open and closed positions independently of movement of frame 32. Thus, frame 32 can remain stationery and/or in its closed position while decklid panel 36 moves between its open and closed position.

Decklid panel 36 includes a latching mechanism (not shown) on a rear portion of decklid panel 36 that selectively engages with a latching member (not shown) on rear transverse member 46 of frame 32. The latching mechanism is operable to retain decklid panel 36 in its closed position and fixed relative to frame 32. When decklid panel 36 is latched in its closed position, frame 32 can move between its open and closed position and decklid panel 36 will remain in its closed position. The latching mechanism is a typical slam latch member such as those employed on the trunk lids of automotive vehicles. For example, the decklid latch disclosed in U.S. Pat. No. 4,971,370, entitled "Self-Raising Decklid Latch," and the trunklid lock disclosed in U.S. Pat. No. 4,979,384, entitled "Trunklid Lock with Remote Release," the disclosures of which are incorporated herein by reference, can be used as the latching mechanism.

Figure 6A:
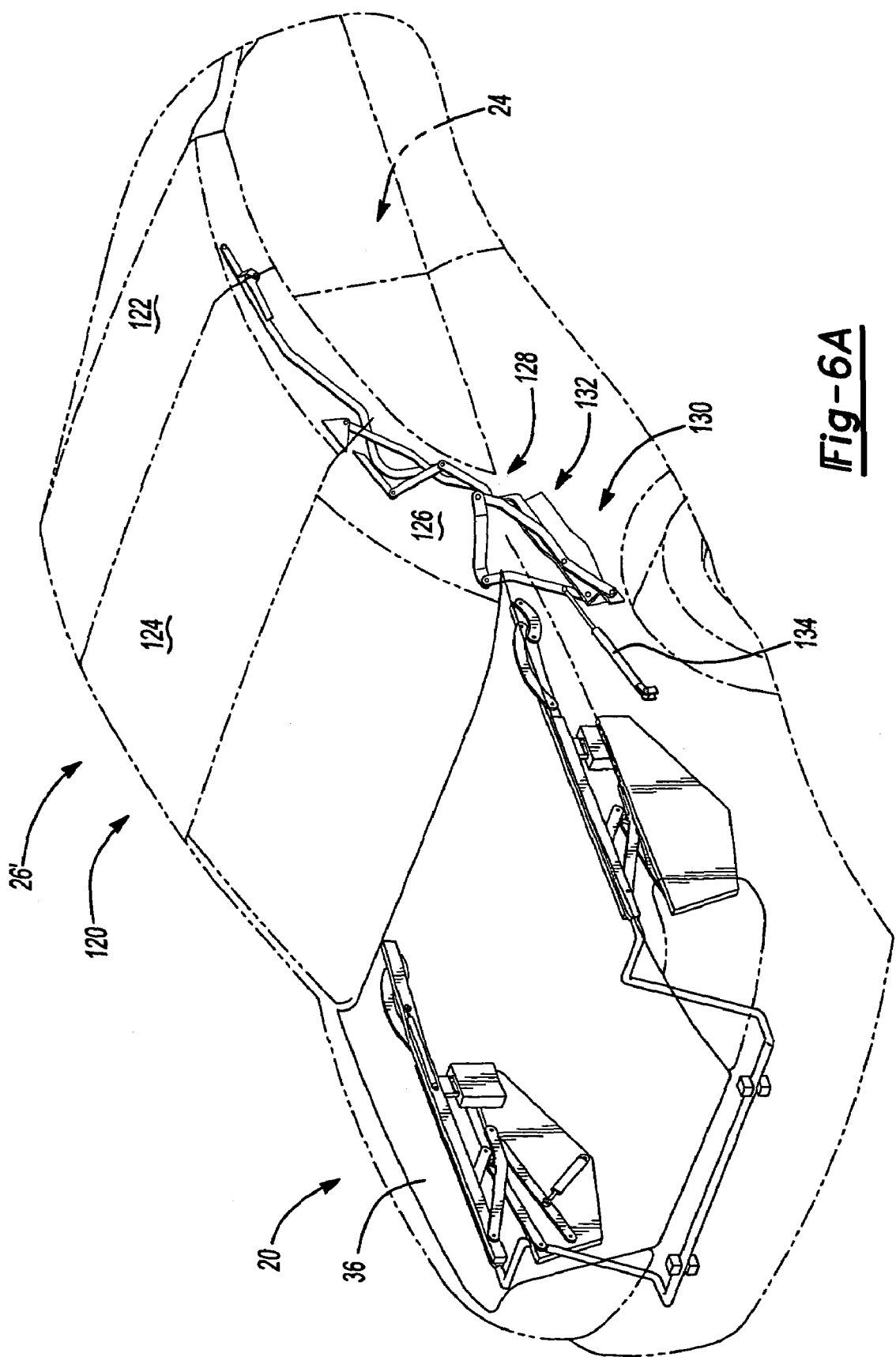
FIG. 6A is a fragmented perspective view of a hardtop convertible roof vehicle with the convertible roof in a raised position and with a decklid assembly according to the principles of the present invention.
Figure 6B:
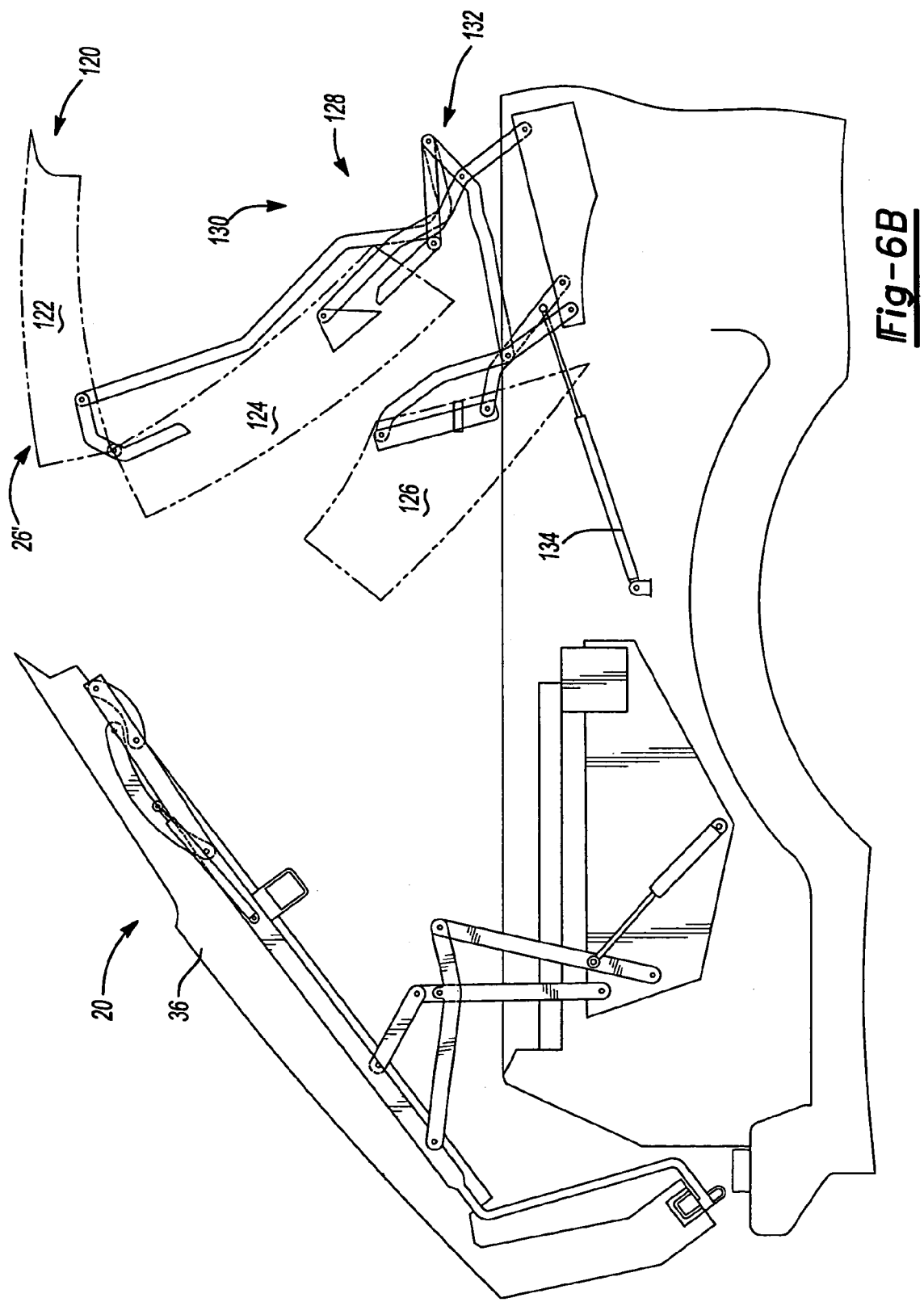
FIG. 6B is a fragmented elevation view of the vehicle of FIG. 6A with the hardtop convertible roof in an intermediate position and the decklid assembly open to allow retraction and extension of the hardtop convertible roof.
Figure 6C:
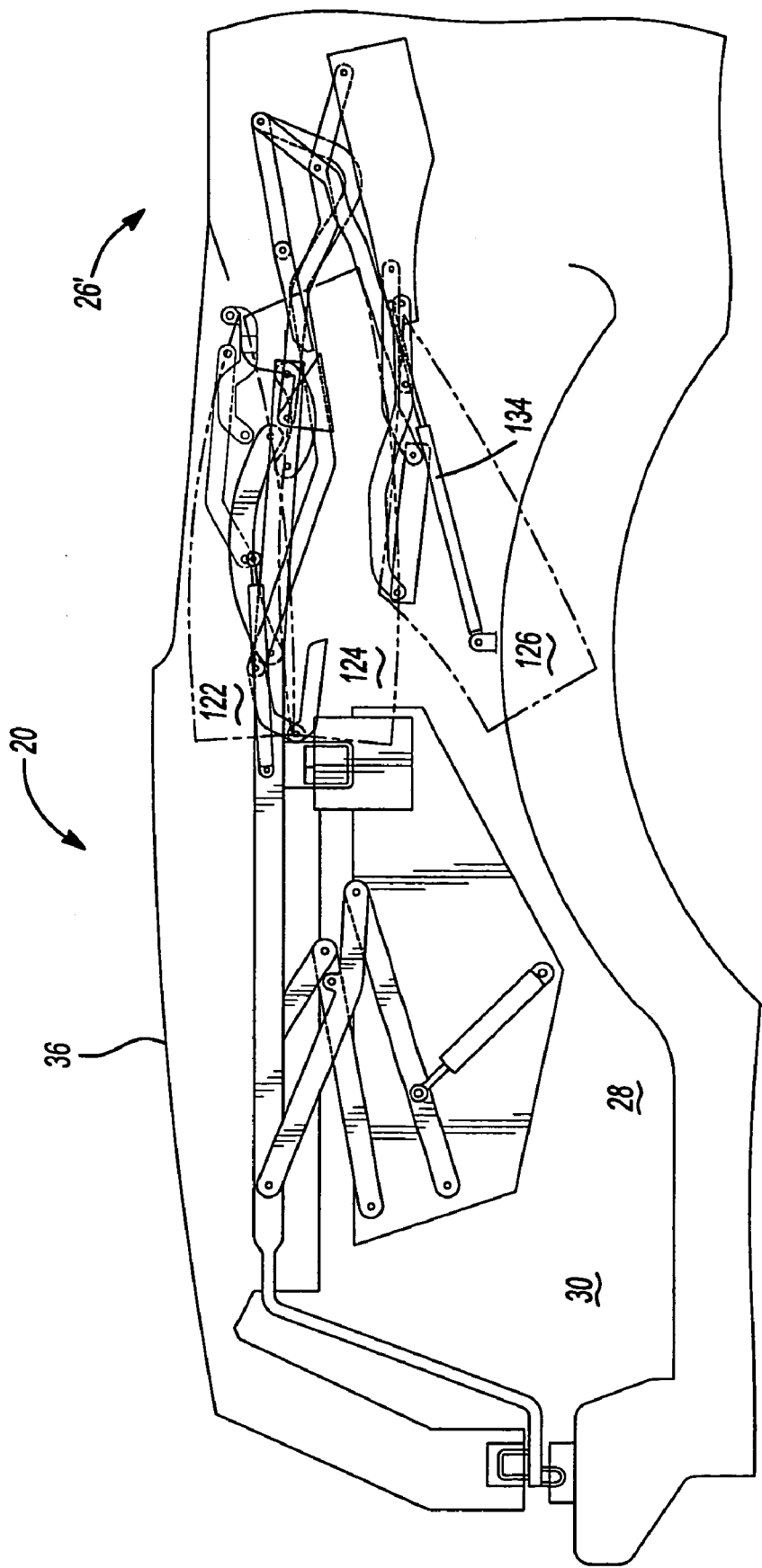
FIG. 6C is a fragmented elevation view of the vehicle of FIG. 6A with the hardtop convertible roof in a fully retracted position and the decklid assembly closed.

Decklid assembly 20 can be used on a vehicle 22 having a convertible roof system 26 that is a hardtop convertible roof system 26', such as that shown in FIGS. 6A–C or, alternatively, a soft-top convertible roof system 26", such as that shown in FIGS. 7A–C which will be further described hereinafter. Referring to FIGS. 6A–C, decklid assembly 20 is shown being used with a hardtop convertible roof system 26'. Hardtop convertible roof system 26' is the same as that disclosed in U.S. Ser. No. 10/245,973 filed on Sep. 18, 2002, entitled "Vehicle Retractable Hardtop Roof" by Willard and assigned to the assignee of this Application, the disclosure of which is incorporated by reference herein.

Hardtop convertible roof system 26' is moveable between an extended or raised position, shown in FIG. 6A, wherein the passenger compartment 24 is covered by the hardtop convertible roof system 26' and a retracted or stowed position, as shown in FIG. 6C, wherein the hardtop convertible roof system 26' is stored in stowage compartment 28 and covered by decklid panel 36. Hardtop convertible roof system 26' includes a convertible roof 120. Convertible roof 120 includes a first roof section 122, a second roof section 124, a third roof section 126, and a retraction mechanism 128. Each of the first, second and third roof sections are substantially rigid members interconnected to one another by a retraction mechanism 128. Retraction mechanism 128 is mounted in a cavity of stowage compartment 28. Retraction mechanism 128 includes a pair of actuation assemblies 130 mounted near each outboard edge of vehicle 22. Each of the actuation assemblies 130 are substantially identical mirror images to one another and only the passenger side actuation assembly is depicted.

Actuation assembly 130 includes a linkage assembly 132 coupled to an actuator 134. Actuator 134 is depicted as a hydraulic cylinder coupled to linkage assembly 132. It should be appreciated that actuator 134 may alternately be constructed as an electric motor, a pneumatic cylinder or any suitable power source for driving linkage assembly 132. Preferably, actuator 134 is the same type of actuator as powered actuator 50.

Decklid assembly 20 is controlled to coordinate the movement of modular decklid assembly 20 with that of convertible roof 120 such that stowage compartment 28 is accessible when moving convertible roof 120 between the raised and stowed positions. As depicted in FIG. 6B, to move convertible roof 120 from the raised position to the stowed position, decklid assembly 20 is first operated to cause frame 32 to move to its open position. With access to stowage compartment 28 now available, convertible roof 120 can be moved between the raised and stowed positions. When convertible roof 120 moves from the raised to the stowed position, first roof section 122 pivots relative to second roof section 124 in a clamshell manner such that an inner surface of first roof section 122 approaches an inner surface of second roof section 124 while third roof section 126 begins to enter stowage compartment 28.

Convertible roof 120 is shown in the stowed position in FIG. 6C. First roof section 122 and second roof section 124 are each positioned in a substantially horizontal manner within roof stowage compartment 28. Once in the stowed position, decklid assembly 20 is operated to cause frame 32 to move from its open position to its closed position and cover convertible roof 120 with decklid panel 36. The sequence of operations is reversed to move the convertible roof 120 from the stowed position to the raised position.

Figure 7A:
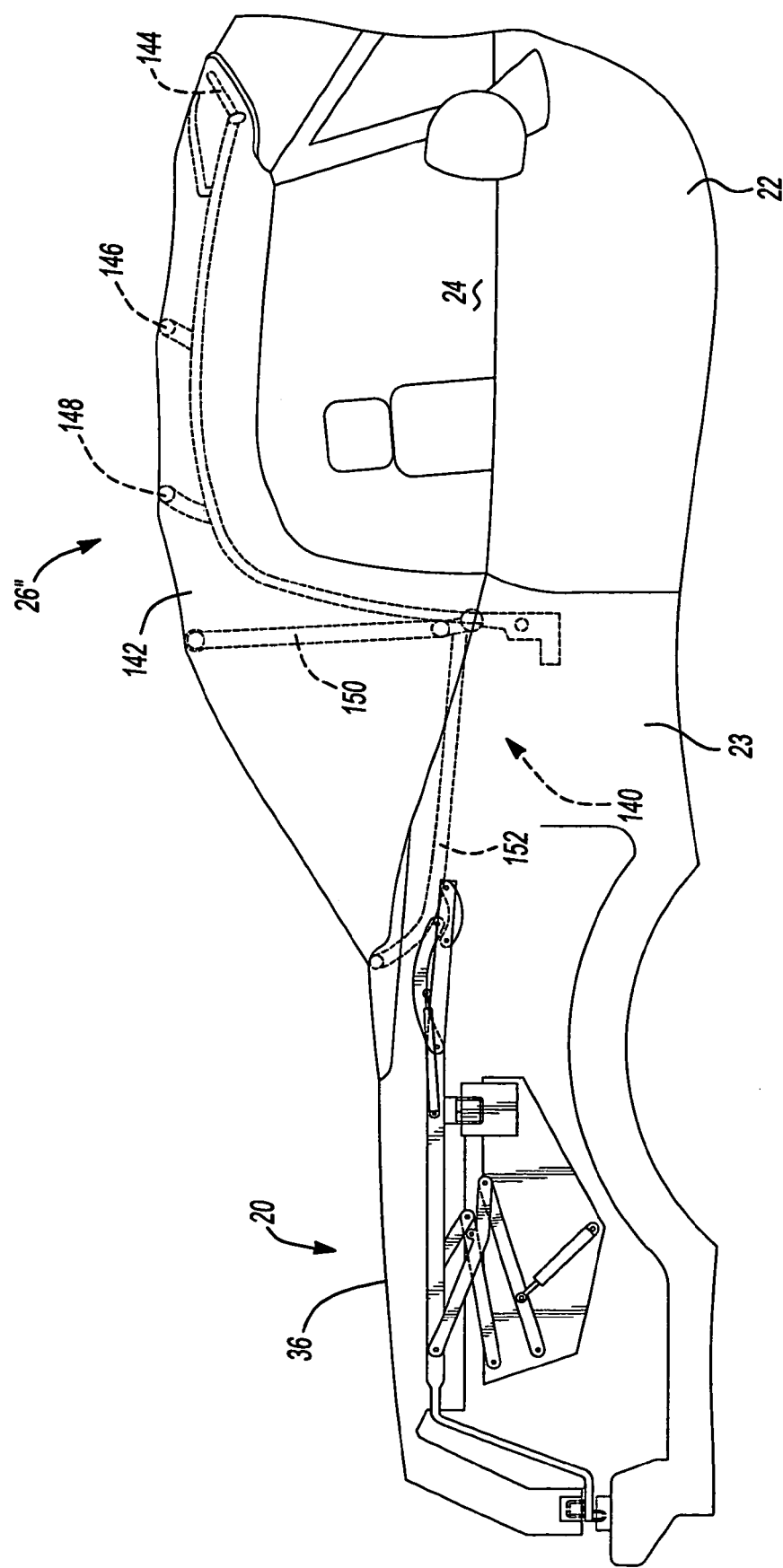
FIG. 7A is a fragmented elevation view of a soft-top convertible roof vehicle with a decklid assembly according to the principles of the present invention.
Figure 7B:
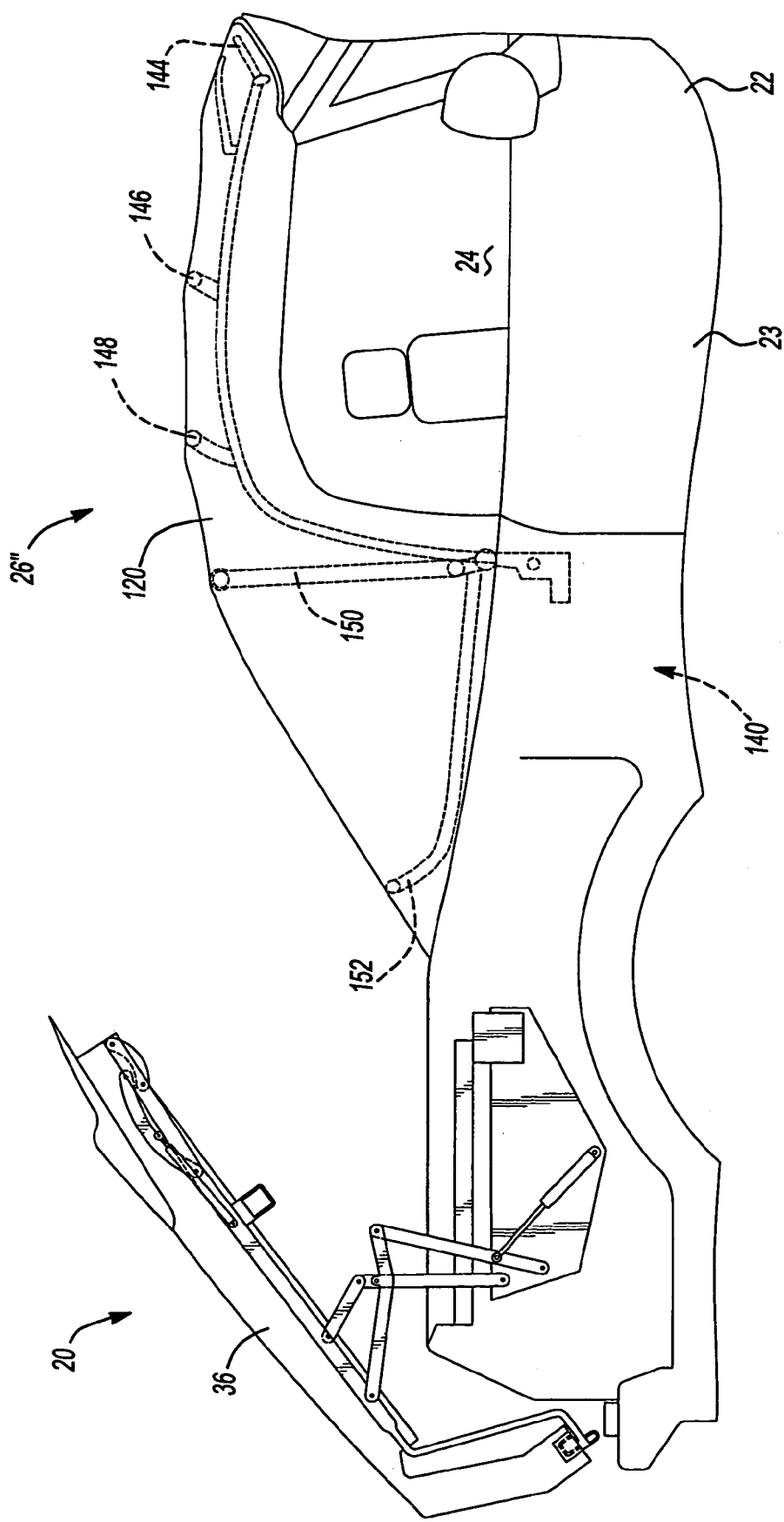
FIG. 7B is a fragmented elevation view of the vehicle of FIG. 7A with the rearmost roof bow of the soft-top convertible roof in an upright position and the decklid assembly closed.
Figure 7C:
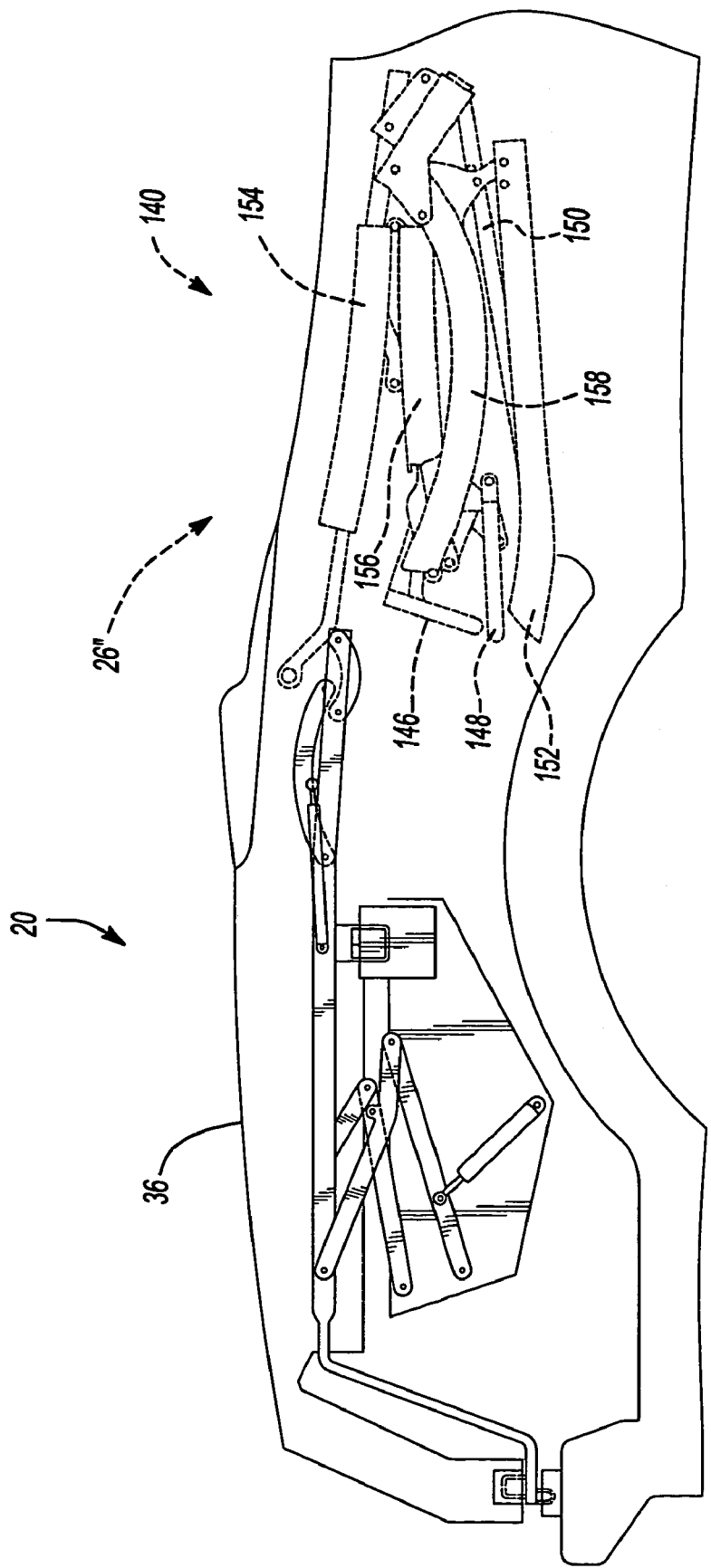
FIG. 7C is a fragmented elevation view of the vehicle of FIG. 7A with the soft-top convertible roof in a fully retracted position and the decklid assembly closed.

Referring now to FIGS. 7A–C, decklid assembly 20 is shown on a vehicle 22 having a soft-top convertible roof system 26". Soft-top convertible roof system 26" includes a linkage assembly or top stack mechanism 140 covered by a pliable fabric top covering 142. More specifically, the linkage assembly includes a number one roof bow 144, a number two roof bow 146, a number three roof bow 148, a number four roof bow 150, and a number five or rearmost bow 152. The top stack mechanism 140 also includes a front roof rail 154, a center roof rail 156, and a rear roof rail 158 (shown in FIG. 7C).

As can be seen in FIG. 7C, front roof rail 154 is pivotally coupled to center roof rail 156 and is controlled by a linkage assembly. Center roof rail 156 is pivotally coupled to rear roof rail 158 and is controlled by a different linkage assembly. Soft-top convertible roof system 26" is operable to move between a raised or extended position covering passenger compartment 24, as shown in FIG. 7A, through intermediate positions to a fully retracted or stowed position within stowage compartment 28, as shown in FIG. 7C.

In operation, frame 32 of decklid assembly 20 is moved from its closed to its open position, as shown in FIG. 7B, to allow access to stowage compartment 28. Soft-top convertible roof system 26" is then retracted into stowage compartment 28, as shown in FIG. 7C. As can be seen, the roof rails 154, 156 and 158 rotate relative to one another and are stacked on top of one another when in the stowed position. Decklid assembly 20 is then operated to cause frame 32 to move to its closed position thereby causing decklid panel 36 to cover at least a portion of soft-top convertible roof system 26". While soft-top convertible roof system 26" is shown as being a manually operated soft-top convertible roof system, it should be appreciated that movement of soft-top convertible roof system 26" between its extended and stowed positions can be automated through the use of powered actuators such as hydraulic cylinders, electric motors, pneumatic cylinders or any suitable power source for driving top stack mechanism 140.

Thus, decklid assembly 20 provides a decklid assembly that covers and conceals stowage compartment 28 and storage area 30. Decklid assembly 20 can be opened to allow access to stowage compartment 28 so that a convertible roof system 26 can move between extended and retracted positions. Decklid assembly 20 can also be operated to cause decklid panel 36 to open to allow access to storage area 30. Thus, decklid assembly 20 provides a dual acting or two-way opening decklid assembly that can be used with a convertible roof vehicle that employs either a soft-top convertible roof system or a hardtop convertible roof system.

While deck lid assembly 20 has been shown as being powered by actuator 50, it should be appreciated that decklid assembly 20 can be a completely manually operated assembly although various advantages of the present invention may not be realized. When decklid assembly 20 is manually operated, it is preferred that a biasing member, such as a spring or gas strut be employed to assist in moving frame 32 from its closed to its open position. It should be appreciated that front linkage assemblies 38 can include a powered actuator, such as those discussed above, to cause front linkage assemblies 38 to move decklid panel 36 between its open and closed positions. Thus, movement of decklid panel 36 between its open and closed positions can be power actuated and be within the scope of the present invention.

Moreover, decklid assembly 20 can be used with other convertible roof systems beyond the specific hardtop and soft-top convertible roof systems disclosed. For example, decklid assembly 20 can be used with a vehicle having an outfolding convertible roof such as that disclosed in U.S. Pat. No. 4,828,317 entitled "Convertible Top Frame with Quarter Windows" by Muscat, and with a vehicle having a soft-top convertible roof system such as that disclosed in U.S. Pat. No. 6,288,511 entitled "Automotive Convertible Top System" by Porter et al. and assigned to the assignee of this Application, the disclosures of which are incorporated by reference herein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cover assembly comprising:
   a frame operable between frame open and frame closed positions, said frame open position allowing convertible roof movement between raised and stowed positions, said frame closed position inhibiting convertible roof movement between raised and stowed positions, and a rear portion of said frame is operable between a latched and unlatched position relative to a vehicle;
   a cover coupled to said frame and operable between cover open and cover closed positions independently of said frame, said cover moving with said frame when said frame moves between said frame open and frame closed positions; and
   a latch mechanism operable to latch said rear portion of said frame to a vehicle,
   wherein said rear portion of said frame is unlatched in said frame open position and is latched in said frame closed position.

2. The cover assembly of claim 1, further comprising a linkage assembly that couples said frame to the vehicle, said linkage assembly being operable to cause said frame to move between said frame open and frame closed positions.

3. The cover assembly of claim 2, wherein said linkage assembly is a scissor link linkage assembly.

4. The cover assembly of claim 2, wherein said linkage assembly is a six-bar linkage assembly.

5. The cover assembly of claim 1, further comprising a linkage assembly that couples said cover to said frame, said linkage assembly operable to move said cover between said cover open and cover closed positions.

6. The cover assembly of claim 5, wherein said linkage assembly is an at least four-bar linkage assembly.

7. The cover assembly of claim 1, further comprising a forward frame latch assembly and wherein a forward portion of said frame is unlatched from said forward frame latch assembly in said frame open position and is latched to said forward frame latch assembly in said frame closed position.

8. The cover assembly of claim 1, wherein an entirety of said frame undergoes a lifting and tilting motion when moving from said frame closed position to said frame open position.

9. The cover assembly of claim 1, wherein said cover is a decklid.

10. An automotive vehicle system comprising:
    a frame operable between frame open and frame closed positions;
    a decklid coupled to said frame and operable between decklid open and decklid closed positions independently of said frame, said decklid moving with said frame when said frame moves between said frame open and closed positions;
    a first linkage assembly operable to couple said frame to an automotive vehicle and move said frame between said frame open and closed positions, said first linkage assembly being at least a five-bar linkage assembly, and said first linkage assembly causing an entirety of said frame to lift and tilt when moving said frame from said frame closed to said frame open position; and
    a second linkage assembly coupling said decklid to said frame and operable to move said decklid between said decklid open and closed positions, said second linkage assembly being at least a four-bar linkage assembly.

11. The automotive vehicle system of claim 10, further comprising a convertible roof system including a convertible roof operable between raised and stowed positions.

12. The automotive vehicle system of claim of claim 11, wherein said convertible roof system includes a hardtop convertible roof.

13. The automotive vehicle system of claim of claim 11, wherein said convertible roof system includes a soft-top convertible roof.

14. The automotive vehicle system of claim 11, wherein said frame opens to allow said convertible roof to move between said raised and stowed positions.

15. The automotive vehicle system of claim 10, further comprising a first latching mechanism operable to selectively latch a rear portion of said frame to the vehicle, said rear portion of said frame being latched to the vehicle when in said frame closed position and said rear portion of said frame being unlatched from the vehicle when in said frame open position.

16. The automotive vehicle system of claim 15, further comprising a second latching mechanism operable to selectively latch a forward portion of said frame to the vehicle, said forward portion of said frame being latched to the vehicle when in said frame closed position and said forward portion of said frame being unlatched from the vehicle when in said frame open position.

17. The automotive vehicle system of claim 10, wherein said first linkage assembly is a scissor link linkage assembly.

18. The automotive vehicle system of claim 10, wherein said first linkage assembly is an at least six-bar linkage assembly.

19. The automotive vehicle system of claim of claim 10, further comprising a powered actuator coupled to said first linkage assembly and operable to cause said first linkage assembly to move said frame between said frame open and closed positions.

20. The automotive vehicle system of claim 10, further comprising a strut having a first end coupled to said decklid and a second end coupled to said frame.

21. An automotive vehicle comprising:
  (a) a convertible roof system operable between raised and stowed positions; and
  (b) a cover system including:
    (i) a frame operable between frame open and frame closed positions;
    (ii) a cover coupled to said frame and operable between cover open and cover closed positions independently of said frame, said cover moving with said frame when said frame moves between said frame open and closed positions; and
    (iii) a rear latching mechanism operable to selectively latch a rear portion of said frame to the vehicle,
  wherein said rear portion of said frame is unlatched from the vehicle when said frame is in said frame open position and is latched to the vehicle when said frame is in said frame closed position.

22. The automotive vehicle of claim 21, wherein said cover system further includes a linkage assembly that couples said frame to the vehicle, said linkage assembly being operable to cause said frame to move between said frame open and closed positions.

23. The automotive vehicle of claim 22, wherein said linkage assembly is a scissor link linkage assembly.

24. The automotive vehicle of claim 22, wherein said cover system further includes a powered actuator coupled to said linkage assembly and operable to cause said linkage assembly to move said frame between said frame open and closed positions.

25. The automotive vehicle of claim 22, wherein said linkage assembly is a six-bar linkage assembly.

26. The automotive vehicle of claim 21, further comprising a linkage assembly that couples said cover to said frame, said linkage assembly operable to move said cover between said cover open and closed positions.

27. The automotive vehicle of claim 26, wherein said linkage assembly is an at least four-bar linkage assembly.

28. The automotive vehicle of claim of claim 21, wherein said convertible roof system includes a hardtop convertible roof.

29. The automotive vehicle of claim 28, wherein said hardtop convertible roof system includes at least three substantially rigid panels.

30. The automotive vehicle of claim 21, wherein said cover system further includes a forward latching mechanism operable to selectively latch a forward portion of said frame to the vehicle and wherein said forward portion of said frame is unlatched from the vehicle when in said frame open position and is latched to the vehicle when in said frame closed position.

31. The automotive vehicle of claim 21, wherein an entirety of said frame undergoes a lifting and tilting motion when moving from said frame closed position to said frame open position.

32. The automotive vehicle of claim 21, wherein said convertible roof system includes a soft-top convertible roof.

33. The automotive vehicle of claim 21, wherein said frame moves to said frame open position when said convertible roof system moves between said raised and stowed positions.

34. The automotive vehicle of claim 21, wherein said cover system further includes a powered actuator operable to cause said frame to move between said frame open and closed positions.

35. The automotive vehicle of claim 21, wherein said cover system is a decklid cover system and said cover is a trunk cover.

36. A method of operating a decklid system on an automotive vehicle, the decklid system including a frame coupled to the vehicle and a decklid coupled to the frame, the method comprising:
  (a) unlatching a rear portion of the frame from the vehicle;
  (b) moving the frame and the decklid from a frame closed position to a frame open position;
  (c) moving the frame and the decklid from the frame open position to the frame closed position; and
  (d) latching a rear portion of the frame to the vehicle,
  wherein the decklid is moveable between decklid open and decklid closed positions independently of the frame and the decklid moves with the frame between the frame open and frame closed positions.

37. The method of claim 36, wherein the frame is coupled to the vehicle with a linkage assembly and (b)and (c) include operating said linkage assembly to move the frame between said frame closed and open positions.

38. The method of claim 37, wherein a powered actuator is connected to the vehicle and to said linkage assembly and (b) and (c) include operating said linkage assembly with said powered actuator.

39. The method of claim 36, wherein the vehicle includes a convertible roof system operable between raised and stowed positions and further comprising moving said convertible roof system between said raised and stowed positions while the frame is in said frame open position.

40. The method of claim 36, wherein (b) includes lifting and tilting an entirety of the frame as it moves from said frame closed position to said frame open position.

41. The method of claim 36, wherein (a) includes unlatching a front portion of the frame from the vehicle and (d) includes latching said front portion of the frame to the vehicle.

* * * * *

UNITED STATES PATENT AND TRADEMARK OFFICE
CERTIFICATE OF CORRECTION

PATENT NO. : 7,032,952 B2
APPLICATION NO. : 10/875960
DATED : April 25, 2006
INVENTOR(S) : Christopher J. Dilluvio It is certified that error appears in the above-identified patent and that said Letters Patent is hereby corrected as shown below:

Column 4, line 15, "end" should be --and--.

Column 4, line 28, "position" should be --positions--.

Column 8, line 59, second occurrence, Claim 12, delete second occurrence of "of claim".

Column 8, line 62, second occurrence, Claim 13, delete second occurrence of "of claim".

Column 9, line 20, second occurrence, Claim 19, delete second occurrence of "of claim".

Column 9, line 65, second occurrence, Claim 28, delete second occurrence of "of claim".

Signed and Sealed this

Twenty-third Day of January, 2007

JON W. DUDAS
*Director of the United States Patent and Trademark Office*